United States Patent
Panther (10) Patent No.: US 11,928,081 B2
(45) Date of Patent: Mar. 12, 2024

(54) EVENT LOGGING FOR VALVES AND OTHER FLOW CONTROL DEVICES

(71) Applicant: Fisher Controls International LLC, Marshalltown, IA (US)

(72) Inventor: Mitch Stephen Panther, Marshalltown, IA (US)

(73) Assignee: Fischer Controls International LLC, Marshalltown, ID (US)

( * ) Notice: Subject to any disclaimer, the term of this patent is extended or adjusted under 35 U.S.C. 154(b) by 194 days.

(21) Appl. No.: 17/363,662

(22) Filed: Jun. 30, 2021

(65) Prior Publication Data

US 2023/0004532 A1     Jan. 5, 2023

(51) Int. Cl.
*G06F 16/00*     (2019.01)
*F16K 31/02*     (2006.01)
*G06F 9/00*     (2006.01)
*G06F 9/32*     (2018.01)
*G06F 9/38*     (2018.01)
(Continued)

(52) U.S. Cl.
CPC .......... *G06F 16/1734* (2019.01); *F16K 31/02* (2013.01); *G06F 9/321* (2013.01); *G06F 9/381* (2013.01); *G06F 9/3834* (2013.01); *G06F 9/5016* (2013.01); *G06F 9/542* (2013.01);
(Continued)

(58) Field of Classification Search
CPC .. G06F 16/1734; G06F 16/1744; G06F 16/61; G06F 9/542; G06F 9/544; G06F 9/321; G06F 9/381; G06F 9/3834; G06F 9/5016; G06F 11/073; G06F 11/0787; G06F 11/141; G06F 11/1654; G06F 11/1666; G06F 11/2017; F16K 31/02
See application file for complete search history.

(56) References Cited

U.S. PATENT DOCUMENTS

| | | | |
|---|---|---|---|
| 7,194,993 B2 * | 3/2007 | Lewis | F02D 13/0215 123/179.16 |
| 7,346,404 B2 * | 3/2008 | Eryurek | G05B 23/0267 700/32 |

(Continued)

FOREIGN PATENT DOCUMENTS

| | | |
|---|---|---|
| GB | 2593634 B * | 9/2021 |
| WO | WO2005097792 A1 * | 10/2005 |

(Continued)

OTHER PUBLICATIONS

Junho Lee et al., "Multi-parametric model predictive control for variable valve timing", 2017 17th International Conference on Control, Automation and Systems (ICCAS), Dec. 2017, pp.*

*Primary Examiner* — Srirama Channavajjala
(74) *Attorney, Agent, or Firm* — Quarles & Brady LLP (57) ABSTRACT

A control system for a valve or other flow control device can include a processor device. The control system can further include a memory in communication with the processor device. The memory may have a fixed maximum capacity. The control system can further include one or more ports to receive signals corresponding to events for the valve or other flow control device. The processor device can be configured to execute operations that include: over a time interval, counting a quantity of events of a first type, corresponding to the signals received at the one or more ports, and after the time interval, storing in the memory a record of the first type of event over the time interval, based on the counted quantity.

20 Claims, 3 Drawing Sheets

(51) Int. Cl.
*G06F 9/50* (2006.01)
*G06F 9/54* (2006.01)
*G06F 16/17* (2019.01)
*G06F 16/174* (2019.01)
*G06F 16/61* (2019.01)

(52) U.S. Cl.
CPC .......... *G06F 9/544* (2013.01); *G06F 16/1744* (2019.01); *G06F 16/61* (2019.01)

(56) References Cited

U.S. PATENT DOCUMENTS

| | | | | |
|---|---|---|---|---|
| 7,606,681 | B2* | 10/2009 | Esmaili | G05B 23/0254 |
| | | | | 702/182 |
| 7,840,285 | B2* | 11/2010 | Wilson | G05B 19/042 |
| | | | | 709/224 |
| 9,953,036 | B2* | 4/2018 | Mackenzie | G06F 16/178 |
| 10,441,833 | B2* | 10/2019 | Pohl | A62C 35/60 |
| 10,797,965 | B2* | 10/2020 | Nieves | H04L 43/08 |
| 10,866,952 | B2* | 12/2020 | Nixon | G06F 16/252 |
| 2007/0244571 | A1* | 10/2007 | Wilson | G05B 19/042 |
| | | | | 707/E17.005 |
| 2008/0046104 | A1* | 2/2008 | Van Camp | G05B 23/0283 |
| | | | | 715/764 |
| 2009/0254573 | A1* | 10/2009 | Wojciechowski | G05B 23/027 |
| 2015/0176721 | A1* | 6/2015 | Schoonover | G01M 99/00 |
| | | | | 702/35 |
| 2018/0182228 | A1* | 6/2018 | Alcorn | G01F 1/68 |
| 2019/0165989 | A1* | 5/2019 | Jacobs | G05B 23/0235 |
| 2020/0081410 | A1* | 3/2020 | Walker | F16K 37/0041 |

FOREIGN PATENT DOCUMENTS

| | | | |
|---|---|---|---|
| WO | WO2010144100 | A1 * | 12/2010 |
| WO | WO2017165865 | A2 * | 9/2017 |
| WO | WO 2019113677 | A1 * | 6/2019 |

* cited by examiner

EVENT LOGGING FOR VALVES AND OTHER FLOW CONTROL DEVICES

BACKGROUND

Flow control devices, including control valves, can be important in a variety of contexts. In some settings, flow control devices can include or be configured to interoperate with controllers (e.g., electronic processing devices) to record or otherwise control certain functions or operational parameters. For example, a valve is a type of flow control device that can include a controller that records events at the valve or controls operation of the valve in various ways.

SUMMARY

The present invention relates generally to valves or flow control devices, and more specifically, to control systems for valves or flow control devices, including as relates to recording, and implementing control based on, operational data for a valve or other flow control device.

Some embodiments of the invention provide a control system for a valve or other flow control device. The control system can include a processor device and can further include a memory in communication with the processor device. The memory may have a fixed maximum capacity. The control system can further include one or more ports to receive signals corresponding to events for the valve or other flow control device. The processor device can be configured to execute operations that include: over a time interval, counting a quantity of events of a first type, corresponding to the signals received at the one or more ports, and after the time interval, storing in the memory a record of the first type of event over the time interval, based on the counted quantity.

Some embodiments of the invention provide a method of monitoring events at a valve or other flow control device. The method can include registering, with one or more computing devices a plurality of events of a first type at the valve or other flow control device. The method can further include determining, with the one or more computing devices, a quantity of the first type of events over a first time interval. The method can further include with the one or more computing devices, storing in a circular buffer a record of the quantity of the first type of events over the first time interval.

Some embodiments of the invention provide a control system for a valve or other flow control device. The control system can include a processor device and can further include a memory in communication with the processor device. The memory can include a first circular buffer that has a fixed maximum capacity. The control system can further include one or more ports to receive signals corresponding to events for the valve or other flow control device. The processor device can be configured to execute operations that include: over a time interval, counting a quantity of events of a first type, corresponding to the signals received at the one or more ports. The first type of event can include at least one of: an operational alarm, a malfunction, a recovery, and a security alarm. The processor device can be configured to execute operations that further include: after the time interval, storing in the memory a record of the first type of event over the time interval, based on the counted quantity. The record of the first type of event can be locally stored relative to the valve or other flow control device.

In some embodiments, a first type of event at a valve or other flow control device can include at least one of: an operational alarm, a malfunction, a recovery, or a security alarm. In some embodiments, a security alarm can indicate one or more of: a changed set point, a manual engagement, an attempt to change a locked parameter, or an attempt to access a blocked communication port.

In some embodiments, a processor device can be configured to execute operations that include: over a second time interval that is different from a first time interval, counting a second quantity of a second type of event corresponding to the signals received at the one or more ports, the second type of event being different from a first type of event; and after the second time interval, storing in the memory a record of the second type of event over the second time interval, based on the second counted quantity. In some embodiments, a second type of event can be a security alarm, a first type of event can be not a security alarm, and a second time interval associated with the second type of event can be shorter than a first time interval associated with the first type of event.

In some embodiments, a memory can be configured to include a first circular buffer and a record of a first type of event over a time interval can be stored in the first circular buffer. In some embodiments, a first circular buffer can be part of a first memory, and a quantity of events of a first type can be counted based on storing in a second memory, of a different type than the first memory, a temporary record of the events of the first type during the time interval.

In some embodiments, a memory can be further configured to include a second circular buffer, and a processor device can be configured to execute operations that include: over a second time interval, counting a quantity of events of a second type, corresponding to the signals received at one or more ports, and storing a record of the second type of events over the second time interval in the second circular buffer.

In some embodiments, a first event logger can be configured to provide signals corresponding to events of a first type, a second event logger can be configured to provide signals corresponding to different events than the first event logger, and a processor device can be configured to execute operations that include: over a second time interval, counting a quantity of the different events, corresponding to the signals received at the one or more ports; and storing a record of the different events over the second time interval in the second circular buffer.

In some embodiments, a record of events of a first type over a time interval may not include distinct data for each of the events of the first type over the time interval.

In some embodiments, a record of a first type of event during a time interval can be configured to include: a record of each event of the first type during the time interval, if a total number of events of the first type during the time interval is below a first threshold number; and a record of the counted quantity of events during the time interval, if the total number of events of the first type during the time interval is above a second threshold number.

In some embodiments, a record of one or more types of event can be locally stored relative to a valve or other flow control device.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, flow control devices can include controllers that are configured to monitor or otherwise control operation of the flow control devices. Further, in some cases, the controllers can be used to log (i.e., record in memory) certain events. For example, a log can be maintained for notable levels or changes for operational parameters, for access attempts, or for other types of events may provide operators with useful information to evaluate valve performance, identify potential or actual malfunctions or other problems, or otherwise monitor valve operation.

During operation of a flow control device, the frequency of occurrence of certain events may be relatively high. Accordingly, logging of events using conventional approaches can sometimes result in lost or incomplete information. For example, in view of the discussion above, the larger the number of events that can be stored in memory, the less likely that the storage of an event will be missed. However, practical considerations may result in relatively limited memory space being allocated to an event log. Accordingly, conventional control systems, which typically log every instance of relevant events, can quickly reach storage capacity, which can result in a loss of historic log information (i.e., records of past events) as logging of new events to the limited memory requires old events to be overwritten.

This deficiency of conventional approaches may be particularly problematic for certain types of events. For example, a sensor losing and re-establishing communication with a valve controller may correspond to dozens of events per second (or more), which can quickly fill up the limited space in the memory. Further, premature loss of historic log information (e.g., due to over-writing of older events once the memory is full) can be problematic for security, in some cases, because malicious activity that may otherwise be identifiable from logged events may more readily escape operator notice when log memory is being overwritten at a high frequency. Additionally, valve or flow control devices with these issues may have to be monitored by an operator more frequently, if the operator is to review the event log before it is overwritten. Thus, for example, a need exists for a method of monitoring events at a valve or flow control device that can more effectively preserve log information and thereby generally improve operation of computerized control systems (e.g., to help to prevent relevant logged events from being prematurely overwritten).

Embodiments of the invention can be useful for this purpose, and others. For example, embodiments of the invention may include a control system (or related method) for a valve or other flow control device that can consolidate similar types of events for logging and thereby increase the capacity of a control system with limited memory to log events over time. In some cases, in particular, a control system (or method) can utilize a circular buffer to store indicators of a quantity of a certain type of event over a particular time interval, rather than storing a log entry for each of those events. Thus, for example, useful information regarding all of the logged events of the certain type over the particular time interval can be preserved with substantially less demand on memory than under conventional systems. Similarly, embodiments of the invention can be useful for monitoring a plurality of different event types over a time interval (i.e., from beginning to end of the time interval), while reducing (e.g., minimizing) the amount of memory that may be required for logging the multiple event types over the time interval, including by storing a record of respective quantities of the particular types of events over a period of time. Further, in some cases, certain types of events can be logged differently, including by logging different types of event using different respective parts of memory, by quantifying (e.g., counting) different types of events relative to different respective time intervals, and as otherwise discussed below.

Figure 1:
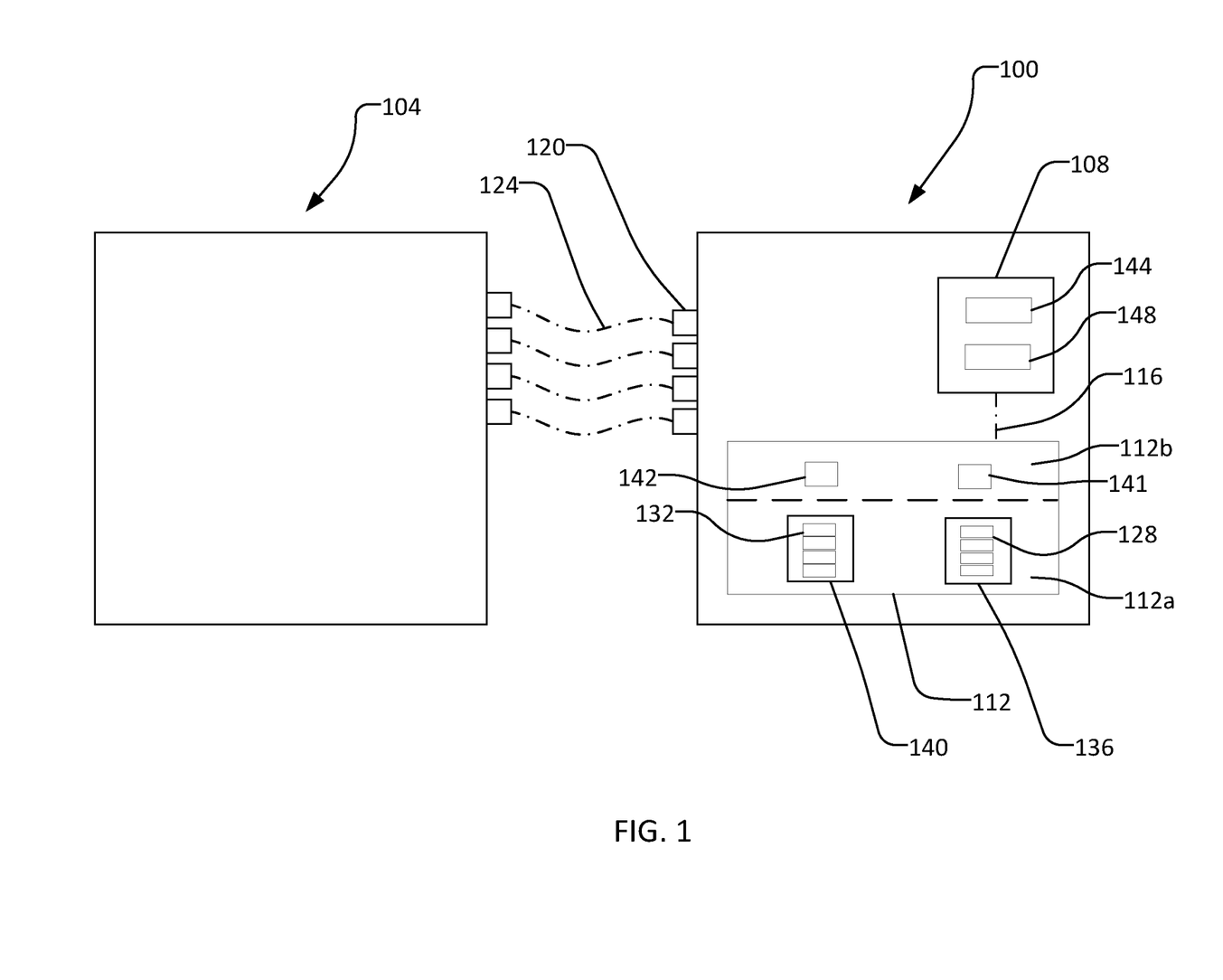
FIG. 1 is a schematic view of a control system for a valve or other flow control device, according to an embodiment of the invention.

FIG. 1 illustrates an example configuration of a control system 100 for a valve or other flow control device 104 (e.g., a control valve or regulator of various know types, etc.). The control system 100 may include a processor device 108 and a memory 112 in communication with the processor device 108. The processor device 108 may be in communication with the memory 112 via a communication channel 116 of any of a variety of known configurations. In particular, the memory 112 can have a fixed maximum capacity. For example, some known controllers can separately store distinct records of roughly 200,000 events in memory that is allocated to log storage. The control system 100 may further include one or more inputs or ports 120 of any of a variety of known configurations, to receive signals over one or more communication channels 124 that provide data corresponding to a variety of types of events for the valve or other flow control device 104 (e.g., an operational alarm, a malfunction, a recovery, or a security alarm for the device 104, as further discussed below). The control system may include any number of ports 120, including four distinct ports 120, as shown, and in some cases can include ports of multiple types. Similarly, the control system 100 can receive event data via any number of channels 124, including four channels 124 dedicated to respective ports 120, as shown, and in some cases can include channels of multiple types.

Generally the processor device 108 may be configured according to known approaches to execute automatic computational operations. In particular, in some embodiments, the processor device 108 can be configured to identify a quantity of events of a particular type, over a particular time interval, and then update a log stored in memory 112 based on the identified quantity. For example, the processor device 108 may execute operations, over a first time interval, that count a first quantity of events of a first type that correspond the signals received at the one or more ports 120. Then, after the first time interval, the processor device 108 may execute operations that store in the memory 112 a record 128 of the first type of event over the first time interval, based on the first counted quantity. For example, for the record 128, the processor device 108 can store data indicating the quantity of events over the first time interval (e.g., a single value indicating the quantity, or a set of values indicating the quantity and the event type), but not store distinct records for each of the events over the time interval. Storing the record 128 of the first type of event over the first time interval, based on the first counted quantity, can substantially reduce the amount of space occupied in the memory 112 for the first type of event over the time interval, as compared to if each instance of the first type of event was stored as an individual record in the memory 112.

In some embodiments, the processor device 108 can be configured to apply a similar, but separate approach for different types of events. For example, in certain embodiments, the processor device 108 may be configured to execute operations over a second time interval to count a second quantity of a second type of event corresponding to the signals received at the one or more ports 120 (e.g., one or more different ports than received signals corresponding to a first type of event). The second type of event may be different from the first type of event. Alternatively, the second type of event may be the same as the first type of event but may be otherwise differentiated (e.g., from a different valve or component). The second time interval may be different from the first time interval. Alternatively, the second time interval may be the same as the first time interval. After the second time interval, the processor device 108 may be configured to store in the memory 112 a record 132 of the second type of event over the second time interval, based on the second counted quantity. By storing in the memory 112 the record 132 of the second type of event over the second time interval, based on the second counted quantity, the amount of space occupied in the memory 112 by the second type of event can also be reduced relative to storing each instance of the second type of event as an individual record in the memory 112.

In some cases, a data log can be executed with a circular buffer (e.g., of any variety of generally known configurations), which can be used to store records based on quantities of particular types of events over multiple time intervals. Generally, a circular buffer can be structured and accessed so that successive data records are written in successive (e.g., adjacent) locations on the buffer until the buffer is full, at which point additional data records are written over preceding data records, starting at a reference beginning location. In other words, circular buffers can generally operate as fixed-space storage, with a first-in/first-overwritten principle for data.

Still referring in particular to FIG. 1, the memory 112 may include a first circular buffer 136 and record 128 corresponding to the quantity of the first type of event over the first time interval may be stored in the first circular buffer 136. In some cases, multiple circular buffers can be used, including as may correspond to separate storage of records for each (or other subsets) of multiple types of events with a dedicated respective circular buffer. For example, the memory 112 may include a second circular buffer 140 and the record 132 of the second type of event over the second time interval may be stored in the second circular buffer 140. Generally, the memory 112 may include any number of circular buffers, including the two circular buffers 136, 140, as shown.

In some embodiments, a record associated with events of a particular type over a particular interval can be temporarily stored as part of the event logging process discussed above. For example, the memory 112 may include a first memory 112a and a second memory 112b, that is a different type than the first memory. For example, the first memory 112a may be nonvolatile memory (e.g. flash memory of any variety of known configurations) and the second memory 112b may be volatile memory (e.g., temporary cache memory of any variety of known configurations). Correspondingly, for example, the quantity of first or second events over the first time interval may be counted based on storing a temporary record (or records) of the first and second events in the second memory 112b during the relevant time interval(s). Subsequently, a record based on the quantity of the events (e.g., a total count of the first/second events over the first/second time intervals may be stored in the first memory 112a).

Generally, an event logger is a module (e.g., hardware or software) by which an operating system stores and retrieves records of events in a collection called an event log. In some cases, an event logger can additionally (or alternatively) operate store details other than events for a flow control device (e.g., network connection status, processor errors, files accessed, etc.). In some embodiments, a control system can include multiple event loggers that may be configured to separately (or otherwise) log events of different types, or for different flow control devices. In this regard, for example, the control system 100 may further include a first event logger 144 that is configured to provide signals corresponding to the events of the first type. The control system 100 may also include a second event logger 148 that is configured to provide signals corresponding to different events than the first event logger 144. Alternatively, in some embodiments, the second event logger 148 may be configured to provide signals corresponding to the same events as the first event logger 144 (e.g., but for a different device or time interval).

As illustrated, the first and second event loggers 144, 148 are software or hardware modules that may operate as part of the control system 100 (e.g., as part of an integrated device that includes the processor device 108 and the memory 112). Correspondingly, the first event logger 144 may allow the processor device 108 to execute operations that include, over a first time interval, counting a quantity of events of a first type, corresponding to relevant signals 124 received at the one or more ports 120. Similarly, the second event logger 148 may allow the processor device 108 to execute operations that include, over a second time interval, counting a quantity of events of a second type, corresponding to the signals 124 received at the one or more ports 120.

In other embodiments, however, other configurations are possible, including configurations in which one or more event logger is part of a separate device than the processor device 108 or the memory 112, or in which an event logger is configured to log records for multiple event types. In some cases, the system 100 at large may be considered a distinct event logger, and can be implemented alone or as part of a suite of other (e.g., similarly configured) event loggers (not shown).

Referring more specifically to the records 128, 132, the record 128 of the first type of event may not include distinct data for each of the events of the first type over the first time interval. Further, the record 132 of the second type of event may not include distinct data for each of the events of the second type over the second time interval. In some cases, for example, the records 128, 132 may simply indicate a magnitude of a quantity of a relevant type of event over a relevant time interval (e.g., an actual quantity of the type of event over a time interval, or an indication of how the quantity relates to a threshold), rather than a distinct record for each of the relevant type of events over the time interval. In some cases, the record 128 of the first type of event may include a record of each event of the first type during the first time interval, if the total number of events of the first type during the first time interval is below a threshold number. Additionally, the record 128 may further include a record of the counted quantity of events during the first time interval, if the total number of events of the first type during the first time interval is above a threshold number. Similarly, the record 132 of the second type of event may include a record of each event of the second type during the second time interval, if the total number of events of the second type during the second time interval is below a threshold number, and a record of the counted quantity of events during the second time interval, if the total number of events of the second type during the second time interval is above a second threshold number.

Further in this regard, the relevant thresholds noted above may be the same in some cases, and may be different in other cases. For example, the first threshold number may be 5 events, or 10 events, or 15 events, or 20 events, or 25 events, or 30 events, or any number of events. In a preferred embodiment, the first threshold number is 15 events. Similarly, the second threshold number may be 5 events, or 10 events, or 15 events, or 20 events, or 25 events, or 30 events, or any number of events. In a preferred embodiment, the second threshold number is 15 events. Generally, the first threshold number may be the same as the second threshold number, or may be different than the second threshold number, depending on the nature of the type of events to be recorded, the particular flow control device(s) being monitored, etc.

As also similarly discussed above, efficiency of memory use and ability to store substantial logs can be generally improved by storing a record of event quantity if the total number of relevant events during a time interval is above a threshold and by storing records of individual events if the total number of relevant events is below a threshold. For example, storing records of a quantity of events can save space in the memory 112, as also noted above, because each of the events of the first type will not be individually stored in a record. Further, storing records of individual events that have a less frequent occurrence can maintain granularity for diagnostics, monitoring, or other efforts, while not requiring substantial space in memory.

In some embodiments, event loggers and related control systems can be configured to store event logs locally (e.g., without transmitting data over internet, intranet, or other networks). In this regard, for example, the records of the first type of events 128 may be locally stored relative to the valve or other flow control device 104. Storing log records locally can advantageous for security, in some cases, because data may not need to be transmitted over a network or through foreign devices. Therefore, data in the records may be shielded (e.g., inaccessible) from connections via network connectivity or via offsite devices and access to the data generally limited. This may correspondingly limit the access that individuals may have to the relevant records and thereby limit the risk that data in the records will be inadvertently or maliciously deleted, altered, or otherwise improperly accessed. Additionally, locally saved copy of log records can provide redundancy in the case that other copies become corrupted, lost, or otherwise inaccessible. Similarly to the records 128, records 132 of the second type of events may also (or alternatively) be locally stored relative to the valve or other flow control device 104, for the same advantageous reasons as discussed above.

In some implementations, devices or systems disclosed herein can be used, manufactured, or installed using methods embodying aspects of the invention. Correspondingly, any description herein of particular features, capabilities, or intended uses of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated, discussion herein of any method of manufacturing or use for a particular device or system, including installing the device or system, is intended to inherently include disclosure, as embodiments of the invention, of the utilized features and configurations, and implemented capabilities of such device or system.

Figure 2:
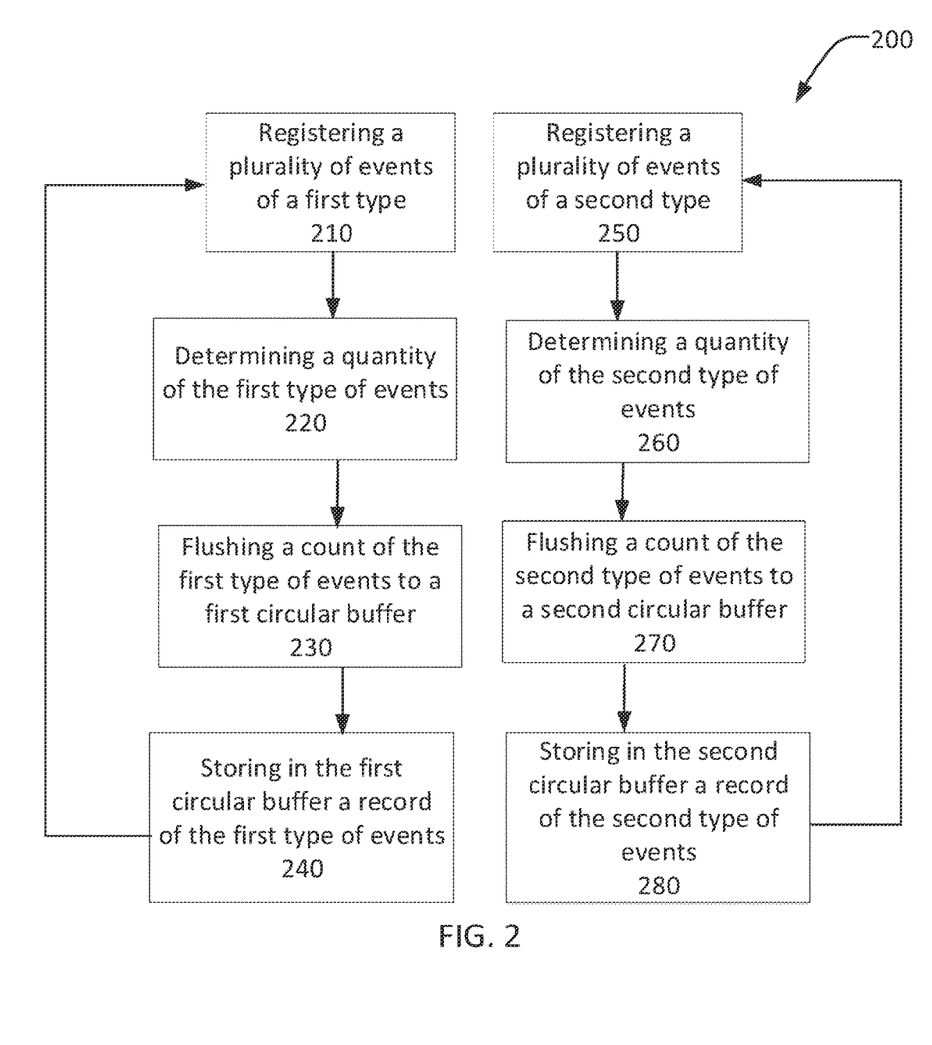
FIG. 2 is a flowchart of a method of monitoring events at a valve or other flow control device, according to an embodiment of the invention.

In this regard, for example, FIG. 2 illustrates an example method of monitoring events 200 at a valve or other flow control device. In some cases, the method 200 can be implemented on the control system 100 in order to monitor events for the flow control device 104 (see FIG. 1). In other cases, the method 200 can be implemented with other control systems or for other flow control devices. Generally, the method 200 can be executed as a computer-implemented method, using known processing (and other) devices and general programming structures. In some cases, the method 200 can be implemented in software modules. In some cases, the method 200 can be implemented via special-purpose hardware.

The method 200 may include a first operation 210 that can include registering a plurality of events of a first type at a valve or other flow control device (i.e., receiving and processing data that indicates the occurrence of the plurality of events of the first type). The method 200 may further include a second operation 220 that can include determining a quantity (e.g., absolute total number) of the first type of events over a first time interval. For example, the method may include operations 220 for counting a total number of events of a particular type over a particular (e.g., regular) time interval based on signals received at one or more ports (e.g., the ports 120 of FIG. 1). The method 200 may further include a third operation 230 that can include flushing a count of the first type of events to a first circular buffer. For example, the third operation 230 can include flushing a count of the first type of events to a first circular buffer at the end of the first time interval. Generally, by flushing a count of events to a circular buffer at the end of a time interval, the count of events can be regularly transferred from its temporary location in memory to a more permanent location in memory. The method 200 may further include a fourth operation 240 that can include storing in a circular buffer a record based the quantity of the first type of events over the first time interval.

Still referring to FIG. 2, the method 200 may further include a fifth operation 250 that can include registering a plurality of events of a second type, a sixth operation 260 that can include determining a quantity of the second type of the plurality of events over a second time interval (e.g., counting at total number of the events), a seventh operation 270 that can include flushing events a count of the second type of events to a second circular buffer, and an eighth operation 280 that can include storing in a second circular buffer a record of the second type of events over the second time interval (e.g., the total number of the events). As also generally indicated above, storing logs of different types of events in different circular buffers can generally allow for more customized optimization of memory allocations, sampling intervals, time intervals for quantification before logging, etc. In this regard, for example, a first circular buffer under the method 200 can sometimes be a different size than a second circular buffer, a first time interval may be a different length than a second time interval, a first type of event can be different from a second type of event (or relate to a different flow control device), etc.

During monitoring of a flow control device, the operations of the method 200 (and of the disclosure generally) can iterate as appropriate. For example, before or after (or while) storing a record of certain types of events in associated circular buffers, the method 200 can include repeated operations 210, 250 and 220, 260 to register events of different types over later (e.g., successive) time intervals and determine quantity values for those registered events. The relevant circular buffer(s) can then be updated based on the determined quantities, and the process repeated indefinitely, as needed.

Generally, embodiments of the invention, including the control system 100 and the method 200, can be used to log any variety of relevant, measurable event types for a particular flow control device. For example, referring to FIG. 3, relevant types of events at the a valve or other flow control device that may be monitored under the method 200 can sometimes include at least one of: an operational alarm 291, a malfunction 292, a recovery 293, or a security alarm 294. An operational alarm is a type of event that occurs based on a measurement or calculation of operational pressure, temperature, flow rate, or any other operational parameter for a valve or other flow control device. In some cases, an operational alarm 291 may be triggered when a measured value of the valve or other flow control device 104 exceeds a specified (e.g., predetermined) threshold. A malfunction is a type of event that occurs when a control system or related device is functioning incorrectly or abnormally. For example, a malfunction event may indicated that a sensor or transmitter is not functioning properly (e.g., not functioning at all), or may indicate a malfunction in flow control device itself (e.g., due to a stuck or fouled valve element). A recovery is a type of event that occurs when an alarm condition (e.g. an operational alarm or a security alarm) or malfunction is appropriately (e.g., fully) resolved.

A security alarm is a type of event that indicates changes or attempts to change designated critical parameters. In this regard, for example, a security alarm may occur when a control system or flow control device may require prompt or close attention from an operator. In some cases, a security alarm may result from an access attempt for a blocked port, a change or attempted change in a critical setting, an unexpected or unauthorized network connection, or other designated conditions or occurrences.

Figure 3:
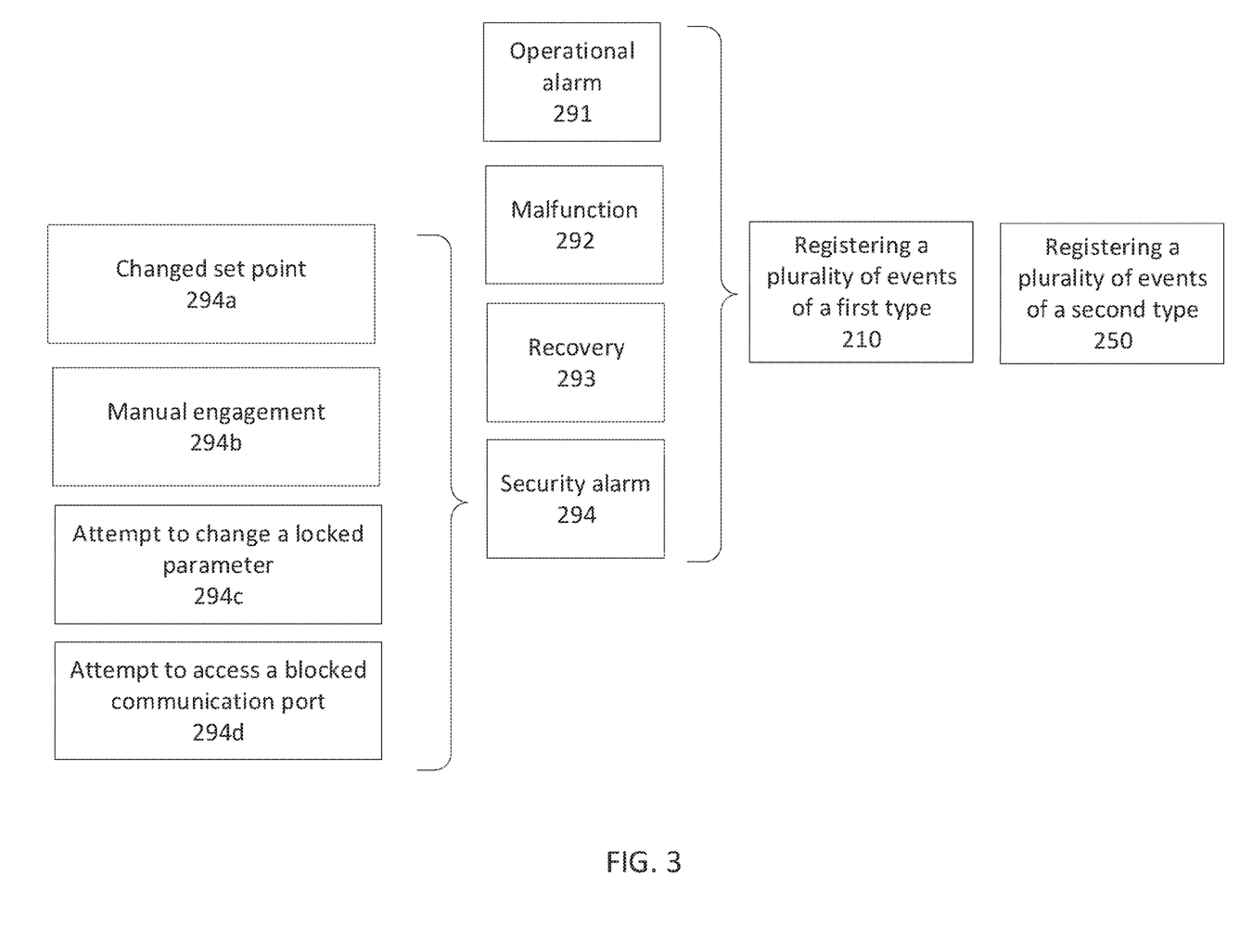
FIG. 3 is a flowchart of part of the method of monitoring events at a valve or other flow control device of FIG. 2, according to an embodiment of the invention.

Continuing with regard to FIG. 3, the security alarm 294 may thus sometimes indicate one or more of: a changed set point 294a, a manual engagement 294b, an attempt to change a locked parameter 294c, or an attempt to access a blocked communication port 294d. In some cases, the changed set point 294a may be a changed set point for an operational pressure, temperature, flow rate, or any other adjustable operational parameter. In some cases, the manual engagement 294b can include manual adjustments to a flow control device (e.g., manual opening, closing, or venting) or manually implemented changes in a control system (e.g., disconnection of a signal line), as may sometimes correspond to security concerns if not appropriately authorized. The attempt to change a locked parameter 294c can be, for example, an attempt to change an operational setting of the valve or other flow control device 104 that has been locked against unauthorized changes (e.g. settings such as set pressure, maximum flow rate, etc.). Finally, in some cases, the attempt to access a blocked communication port 294d may correspond to a manual or electronic attempt to provide data to or obtain data from a port on a control device (e.g., one of the ports 120 (see FIG. 1) that has been previously (e.g., selectively) blocked.

As generally noted above, in some embodiments, events of different types can be separately logged. Further, the respective time intervals for different types of event may sometimes be different, with particular durations that may be selected depending on the type of event with which the time interval is associated. As a further example in this regard, a first type of event may sometimes not be a security alarm (e.g., may be an operational alarm, a malfunction, or a recovery), whereas a second type of event may be a security alarm. Correspondingly, in some cases, the second time interval (i.e., as associated with logging a quantity-based record for the security alarm) may sometimes be shorter than the first time interval (i.e., as associated with a non-security event). For example, a shorter second time interval may help to ensure that more detail is preserved regarding the security alarm, whereas a longer first timer interval may help to more efficiently manage limited memory, including to events that may sometimes occur very high frequencies (e.g., faulty sensors rapidly cycling between settings).

For similar reasons, and as also generally discussed above, different types of events can sometimes be logged using different respective circular buffers. For example, depending on the importance of extended historical data or of consolidating logs over shorter time intervals, certain circular buffers may be configured to be larger than others.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A control system for a valve or other flow control device, the control system comprising:
    a processor device;
    a memory in communication with the processor device, the memory comprising a buffer and a fixed maximum capacity; and
    one or more communication ports;
    wherein the processor device is configured to execute instructions stored in the memory to perform operations comprising:
        receiving signals at the one or more communication ports corresponding to events for the valve or other flow control device;
        over a time interval, counting a first quantity of the events that are associated with a first event type based on the signals received at the one or more communication ports;
        over the time interval, storing a temporary record of the first quantity of the events that are associated with the first event type in the buffer, wherein the first quantity of the events that are associated with the first event type in the buffer is greater than one;
        after the time interval, storing in the memory outside of the buffer a record of the first event type over the time interval, wherein the record of the first event type over the time interval comprises a second quantity of the events that are associated with the first event type, the second quantity less than the first quantity;
        after the time interval, flushing the buffer to clear the temporary record of the first quantity of the events that are associated with the first event type from the buffer; and
        controlling operation of the valve or other flow control device based on the record of the first event type over the time interval.

2. The control system of claim 1, wherein the first event type comprises an operational alarm, a malfunction, a recovery, or a security alarm.

3. The control system of claim 2, wherein the security alarm indicates a changed set point, a manual engagement, an attempt to change a locked parameter, or an attempt to access a blocked communication port.

4. The control system of claim 1, wherein:
    the time interval is a first time interval; and
    the processor device is configured to execute instructions stored in the memory to perform operations comprising:
        over a second time interval that is different from the first time interval, counting a third quantity of the events that are associated with a second event type based on the signals received at the one or more communication ports, the second event type being different from the first event type; and after the second time interval, storing in the memory a record of the second event type over the second time interval, based on the third quantity.

5. The control system of claim 4, wherein:
the second event type is a security alarm;
the first event type is not a security alarm; and
the second time interval is shorter than the first time interval.

6. The control system of claim 1, wherein the buffer is a circular buffer.

7. The control system of claim 1, wherein the second quantity is one.

8. The control system of claim 6, wherein:
the memory comprises a second circular buffer; and
the processor device is configured to execute instructions stored in the memory to perform operations comprising:
over the time interval, counting a third quantity of the events that are associated with a second event type based on the signals received at the one or more communication ports; and
over the time interval, storing a temporary record of the third quantity of the events that are associated with the second event type in the second circular buffer.

9. The control system of claim 8, comprising:
after the time interval, storing in the memory outside of the second circular buffer a record of the second event type over the time interval, wherein the record of the second event type over the time interval comprises a fourth quantity of the events that are associated with the second event type, the fourth quantity less than the third quantity; and
after the time interval, flushing the second circular buffer to clear the temporary record of the third quantity of the events that are associated with the second event type from the second circular buffer.

10. The control system of claim 1, wherein the record of the first event type does not include distinct data for each of the first quantity of the events that are associated with the first event type over the time interval.

11. The control system of claim 10, wherein the record of the first event type comprises an indication of the first quantity of the events that are associated with the first event type.

12. The control system of claim 1, wherein the memory is local to the valve or other flow control device.

13. A method of operating a valve or other flow control device, the method comprising:
receiving, with one or more computing devices, electrical signals corresponding to events for the valve or other flow control device;
counting, with the one or more computing devices during a time interval, a first quantity of the events that are associated with a first event type based on the electrical signals corresponding to the events for the valve or other flow control device;
storing, with the one or more computing devices during the time interval, a temporary record of the first quantity of the events that are associated with the first event type in a buffer in a memory;
storing, with the one or more computing devices after the time interval, a record of the first event type over the time interval in the memory outside of the buffer, wherein the record of the first event type over the time interval comprises a second quantity of the events that are associated with the first event type, the second quantity less than the first quantity;
flushing, with the one or more computing devices after the time interval, the buffer to clear the temporary record of the first quantity of the events that are associated with the first event type from the buffer; and
operating, with the one or more computing devices, the valve or other flow control device based on the record of the first event type over the time interval.

14. The method of claim 13, wherein the first event type comprises an operational alarm, a malfunction, a recovery, or a security alarm.

15. The method of claim 13, comprising:
counting, with the one or more computing devices over the time interval, a third quantity of the events that are associated with a second event type based on the electrical signals corresponding to the events for the valve or other flow control device; and
storing, with the one or more computing devices over the time interval, a temporary record of the third quantity of the events that are associated with the second event type in a second buffer in the memory.

16. The method of claim 15, wherein:
the second event type is a security alarm;
the first event type is not a security alarm.

17. The method of claim 15, wherein:
storing the temporary record of the first quantity of the events that are associated with the first event type in the buffer in the memory comprises storing the temporary record of the first quantity of the events that are associated with the first event type in a first circular buffer in the memory; and
storing the temporary record of the third quantity of the events that are associated with the second event type in the second buffer in the memory comprises storing the temporary record of the third quantity of the events that are associated with the second event type in a second circular buffer in the memory.

18. The method of claim 15, comprising:
storing, with the one or more computing devices after the time interval, a record of the second event type over the time interval in the memory outside of the buffer, wherein the record of the second event type over the time interval comprises a fourth quantity of the events that are associated with the second event type, the fourth quantity less than the third quantity; and
flushing, with the one or more computing devices after the time interval, the second buffer to clear the temporary record of the third quantity of the events that are associated with the second event type from the second buffer.

19. The method of claim 13, wherein the record of the first event type comprises an indication of the first quantity of the events that are associated with the first event type.

20. A control system for a valve or other flow control device, the control system comprising:
a processor device local to the valve or other flow control device;
a memory local to the valve or other flow control device and in communication with the processor device, the memory comprising a buffer and a fixed maximum capacity; and
one or more communication ports;
wherein the processor device is configured to execute instructions stored in the memory to perform operations comprising:
receiving signals at the one or more communication ports corresponding to events for the valve or other flow control device;

over a time interval, counting a first quantity of the events that are associated with a first event type based on the signals received at the one or more communication ports, the first event type comprising an operational alarm, a malfunction, a recovery, or a security alarm;

over the time interval, storing in the buffer a temporary record of the first quantity of the events that are associated with the first event type;

over the time interval, determining that the first quantity of the events that are associated with the first event type exceeds a threshold quantity;

after the time interval, storing in the memory outside of the buffer a record of the first event type over the time interval, wherein the record of the first event type over the time interval comprises a timestamp associated with one of the events that are associated with the first event type and an indication of the first quantity of the events that are associated with the first event type;

after the time interval, flushing the buffer to clear the temporary record of the first quantity of the events that are associated with the first event type from the buffer; and operating the valve or other flow control device based on the record of the first event type over the time interval.

* * * * *